United States Patent [19]
Jeffers et al.

[11] Patent Number: 5,398,145
[45] Date of Patent: Mar. 14, 1995

[54] TRACKING CONTROL APPARATUS INCLUDING A SERVO HEAD HAVING A TAPERED TRANSDUCING GAP

[75] Inventors: Frederick J. Jeffers, Escondido; John Rolker, Carlsbad, both of Calif.

[73] Assignee: Eastman Kodak Company, Rochester, N.Y.

[21] Appl. No.: 238,599

[22] Filed: May 5, 1994

Related U.S. Application Data

[63] Continuation of Ser. No. 774,447, Oct. 10, 1991, abandoned.

[51] Int. Cl.6 .............................................. G11B 5/584
[52] U.S. Cl. ................... 360/77.12; 360/77.01; 360/75; 360/119; 360/121
[58] Field of Search ............... 360/77.12, 77.13, 77.15, 360/77.08, 77.07, 119, 120, 121, 122, 77.01

[56] References Cited

U.S. PATENT DOCUMENTS 3,404,392 10/1968 Sordello ........................ 360/77.07
3,697,705 10/1972 Holt .
5,010,430 4/1991 Yamada et al. .................. 360/77.08
5,099,376 3/1992 Ino et al. ............................. 360/121

Primary Examiner—Aristotelis M. Psitos
Assistant Examiner—Muhammad N. Edun
Attorney, Agent, or Firm—William F. Noval

[57] ABSTRACT

Tracking control apparatus includes a magnetic recording medium (disk or tape) comprising a dedicated servo track having recorded thereon a servo signal having a fixed spatial wavelength, and magnetic playback apparatus comprising a servo tracking head having an elongated tapered transducing gap transverse to the dedicated servo track. The transducing gap has (1) a relatively small magnetic gap length, at a first end of the gap, which is less than the spatial wavelength of the recorded signal, and (2) a relatively large magnetic gap length, at a second opposing end of the gap, which is greater than the spatial wavelength of the recorded servo signal. The servo head is in a desired tracking position when the segment of the tapered gap aligned with the servo track has a magnetic gap length that is equal to the spatial wavelength of the servo signal.

8 Claims, 4 Drawing Sheets

TRACKING CONTROL APPARATUS INCLUDING A SERVO HEAD HAVING A TAPERED TRANSDUCING GAP

This is a continuation application of prior application Ser. No. 07/774,447, filed Oct. 10, 1991, now abandoned.

BACKGROUND OF THE INVENTION

1. Field Of The Invention

The invention relates generally to magnetic recording. More particularly, the invention relates to tracking control.

2. Description Relative to the Prior Art

With reference to the magnetic recording art, tracking is the process of keeping a magnetic head, either record or playback, on a particular track. The purpose of tracking control is to adjust the position of the magnetic head relative to the track or vice versa. In a recording mode, tracking control serves to maximize useable recording area without overwrite of existing record tracks. In a playback mode, tracking control functions to maintain a playback head aligned with a record track for maximum signal-to-noise output.

Tracking control is particularly advantageous for magnetic recording apparatus in which the density of tracks is very high. When playback occurs on apparatus other than that which was used for recording, tracking control has been found to be even more advantageous because of mechanical tolerance build-up inherent in different apparatus, variations in magnetic medium, either tape or disk, and other secondary tolerances.

In positioning a magnetic head, commonly the head is locked into direct coincidence with a selected track by means of a closed-loop head-positioning servomechanism. The "servo" utilizes information prerecorded on the magnetic medium. It is known in the prior art to use one or more tracks (on a disk or tape) exclusively for recorded servo signals which are played back by a magnetic head dedicated exclusively to servo activities.

Commonly, servo information is recorded on opposite sides of a reference centerline. If centered directly over the reference centerline, the magnetic head reads two signals of equal amplitude; if off-center, the amplitude of one signal played back exceeds that of the other. The closed-loop head-positioning servo serves to drive the magnetic head in a direction so as to equally match the respective amplitudes of the two servo signals played back, thereby centering the head over the reference centerline.

Although they generally have been found to work well for their intended purpose, it is axiomatic that prior art tracking control systems introduce additional cost and complexity into magnetic recording apparatus. First, such systems require precision preformatting apparatus for recording servo signals on either side of a track centerline. In many cases the signals differ from each other not only in track location but also in content, such as frequency or the like. Second, playback electronics are required to compare the servo signals played back with respect to each other. In some cases, this can require multiple playback channels having matched electrical characteristics in order to make a meaningful comparison.

SUMMARY OF THE INVENTION

In view of the foregoing, an object of the present invention is to provide tracking control apparatus of simple design and construction.

The object of the invention is achieved by means of the combination of (a) a magnetic recording medium including a dedicated servo track having recorded thereon a servo signal having a fixed spatial wavelength, and (b) magnetic playback apparatus comprising a servo tracking head including an elongated tapered transducing gap, transverse to the servo track, having (1) at a first end of the elongated transducing gap a magnetic gap length which is less than the spatial wavelength of the recorded servo signal, and (2) at a second opposing end of the transducing gap a magnetic gap length which is greater than the spatial wavelength of the recorded servo signal. The magnetic recording apparatus further includes a tracking actuator arranged for moving the servo tracking head laterally with respect to the servo track in response to an output signal of the servo head, to align with the servo track the segment or portion of the tapered transducing gap between opposing ends thereof whose magnetic gap length is equal to the spatial wavelength of the recorded servo signal.

In the "on-track" position of the servo head, i.e., the segment of the servo head aligned with the servo track has a magnetic gap length that is equal to the spatial wavelength of the servo signal, there is a null in the output of the servo head. Conversely, when the servo head is situated on either side of the on-track position, the output signal has a non-zero polarity-dependent amplitude that is functionally related to the deviation between the actual location of the servo head and the desired "on-track" position of the head. In other words, the output of the servo head serves directly as an error signal for tracking control, without requiring a comparison with a predetermined reference signal as is required by prior art tracking control apparatus.

This advantage of the invention, as well as other advantages, will become more apparent in the detailed description of preferred embodiments presented below.

BRIEF DESCRIPTION OF THE DRAWINGS

In the detailed description of preferred embodiments of the invention presented below, reference is made to the accompanying drawings, in which.

DETAILED DESCRIPTION OF PREFERRED EMBODIMENTS

The term "spatial wavelength" in the recording art refers to the distance between successive similarly polarized portions of an alternately polarized recording. It is known in the art that the efficiency of the playback process is a function of the length of the transducing gap of an inductive playback head and the spatial wavelength of recorded signals. In particular, for a maximum signal-to-noise ratio in playback, the length of the transducing gap of an inductive playback head should be half the wavelength of the recorded signal. See, for example, IEEE Transactions On Magnetics, Vol. Mag.-1, No. 4, December 1965, pages 357–363, entitled Reproduce System Noise in Wide-Band Magnetic Recording Systems, by Philip Smaller.

Figure 1:
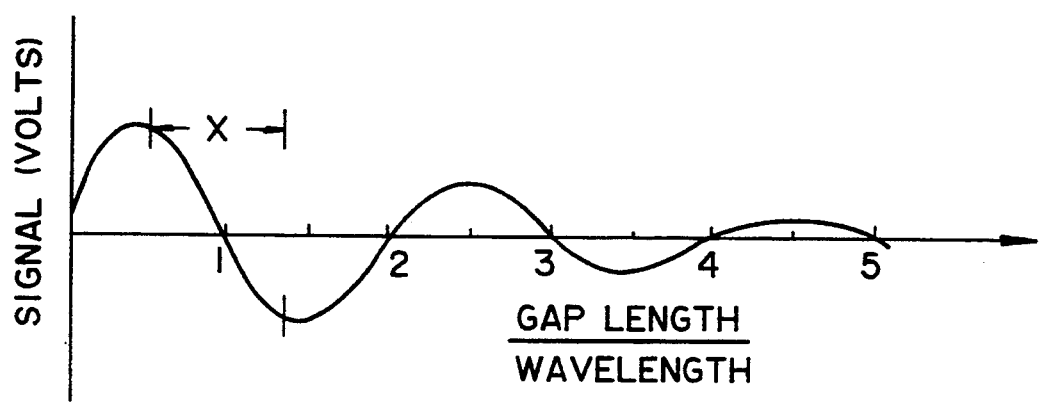
FIG. 1 illustrates the response of an inductive playback head as a function of the ratio of gap length to recorded wavelength.

FIG. 1 illustrates generally the relative output of a playback head in volts as a function of the ratio of its gap length to recorded wavelength. It will be noted that the playback signal is of alternating polarity with nulls appearing when the gap length is an integer multiple of the recorded wavelength. The nulls occur where the respective oppositely polarized halves of the recorded signal contribute equal and opposite amounts of flux to the signal played back. On the other hand, when the gap length is other than an integer value of the recorded wavelength, localized maxima of progressively decreasing amplitude and of alternating polarity occur in the output when the ratio of gap length to recorded wavelength equals $(2n-1)/2$, where n is a positive integer. The letter X of FIG. 1 serves to denote a range of gap length-to-wavelength ratios on opposing sides of the first null over which the output signal is approximately linear.

Before proceeding further, it is believed to be appropriate at this point to address the gap (or gap length) of an inductive playback head, particularly as it relates to the playback of a recorded wavelength. The term "gap length" as used throughout this specification, unless otherwise indicated, is taken to mean "magnetic gap length". The magnetic gap length of a magnetic head may be determined, for example, by (1) recording a set of test signals of various wavelengths on a magnetic medium, and (2) determining the largest wavelength at which a playback head under test experiences a null. In other words, the magnetic gap length of the playback head equals the wavelength at which the null occurs. For more on this see Athey, Magnetic Tape Recording, NASA Publication No. SP-5038, page 66.

Figure 2:
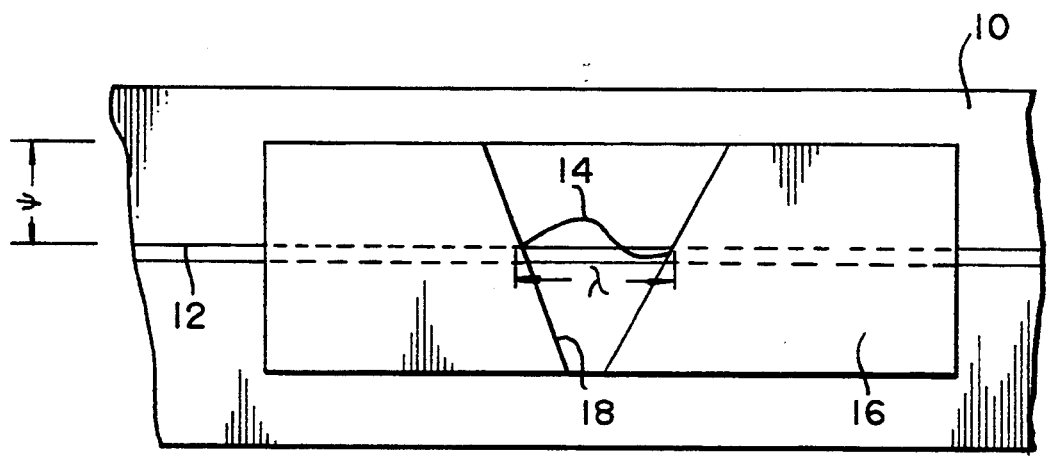
FIG. 2 is an overhead planar view of a servo head having a tapered transducing gap, in accordance with the invention, aligned with a dedicated servo track recorded on a magnetic tape.

The object of the invention is to provide tracking control apparatus of simple design and construction. To that end, the invention requires that a magnetic recording medium, either a disk or tape, include a dedicated servo track having recorded thereon a servo signal having a fixed spatial wavelength. For example, FIG. 2 shows a magnetic tape 10 having a dedicated servo track 12. The track 12 has recorded thereon a servo signal 14 having a fixed spatial wavelength, $\lambda$. (Only one cycle of the servo signal is shown in FIG. 2.)

Tracking control apparatus of simple design and construction further requires a servo head, denoted 16, having an elongated tapered transducing gap 18 transverse to the servo track 12. The transducing gap 18 has (1) at its relatively narrow end a magnetic gap length which is less than the spatial wavelength of the recorded servo signal 12, and (2) at its opposing relatively wide end a magnetic gap length which is greater than the spatial wavelength of the recorded servo signal. In a presently preferred embodiment, the "length" of the narrow end of the transducing gap 18 is selected to be approximately half the length of the wavelength of the dedicated servo signal whereas the wide end of the transducing gap is chosen to be approximately fifty percent (50%) larger than the wavelength $\lambda$ of the recorded servo signal 14.

With this arrangement, there is a null in the output of the servo head 16 when the segment of the transducing gap 18 aligned with the servo track 12 has a magnetic gap length that equals the recorded wavelength $\lambda$. On the other hand, the servo head 16 has a non-zero output when either end portion of the tapered transducing gap 18 is aligned with the servo track 12. For example, the head 16 has a positive maximum output when the servo head is situated toward the top of the tape 10, as viewed in FIG. 2, wherein the narrow end of the transducing gap 18 is aligned with the servo track 12. When this tracking condition exists, the amplitude of the playback signal is a maximum since the gap length of the servo head is approximately half the recorded wavelength. (See FIG. 1). On the other hand, when the servo head 16 strays toward the bottom of the tape 10 wherein the wide end of the transducing gap is aligned with the servo track 12, the amplitude of the playback signal would have a maximum negative-going polarity.

Figure 3:
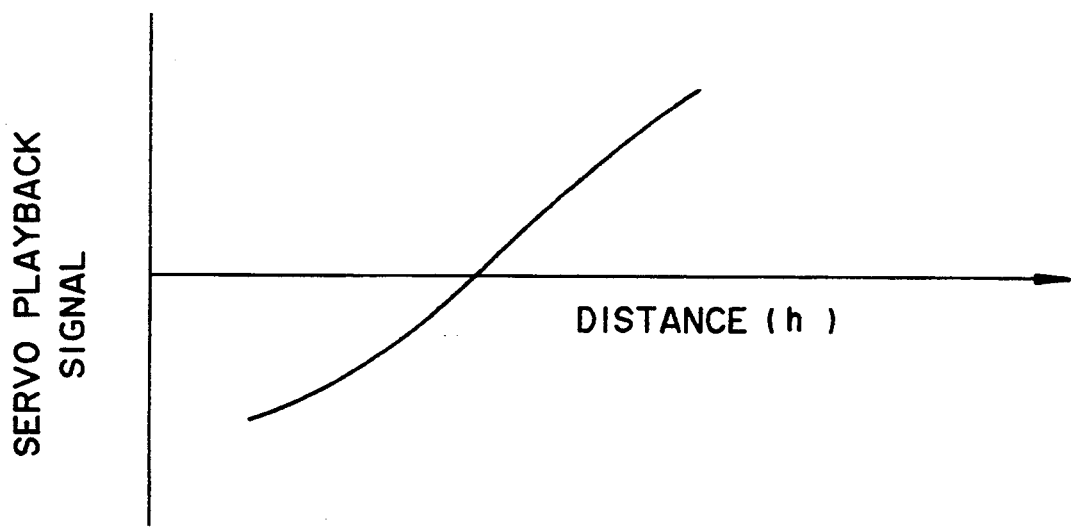
FIG. 3 illustrates a servo playback signal as a function of the position of the tapered transducing gap relative to the dedicated servo track.

FIG. 3 shows generally playback output for intermediate positions of the servo head 16 as a function of the lateral distance, h, that the top of the servo head, as viewed in FIG. 2, is from the servo track 12.

Figure 4:
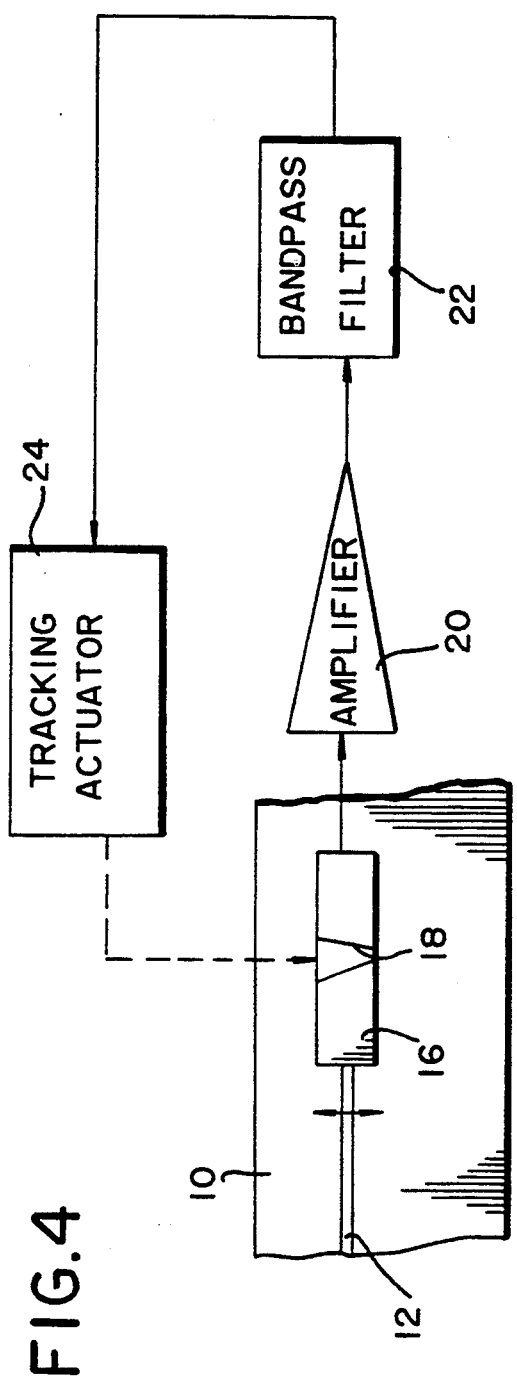
FIG. 4 is a schematic of Cracking control apparatus for use with the servo head of FIG. 2.

FIG. 4 shows tracking control apparatus for moving the servo head 16 laterally with respect to the magnetic tape 10 into a desired tracking position. To that end, an amplifier 20, coupled to the output of the servo head 16, serves to amplify the playback signal to an appropriate level. A bandpass filter 22, connected to the output of the amplifier 20, functions to suppress noise in the signal played back. For that purpose, the filter 22 has a bandpass that is centered at the temporal frequency, f, of the played back signal. The temporal frequency is equal to:

$f = v/\lambda$ where $\lambda$ is, of course, the spatial wavelength of the recorded servo signal, and v is the relative velocity between the tape 10 and the servo head 16.

A tracking actuator 24, coupling the output of the bandpass filter 22 and the servo head 16, serves to position the servo head 16 as a function of the amplitude of the signal, referred to hereinafter as a tracking error signal, at the output the bandpass filter. For that purpose, the tracking actuator 24 functions to move the servo head 16 in a direction that is functionally related to the polarity of the error signal received from the filter 22. When the filter 22 produces a positive error signal, the actuator 24 moves the servo head 16 toward the bottom edge of the tape 10; conversely, the actuator 24, in response to a negative signal, drives the servo head 16 laterally toward the top edge of the tape 10. The amount that the servo head 16 is moved is proportional to the amplitude of the received signal.

Figure 5:
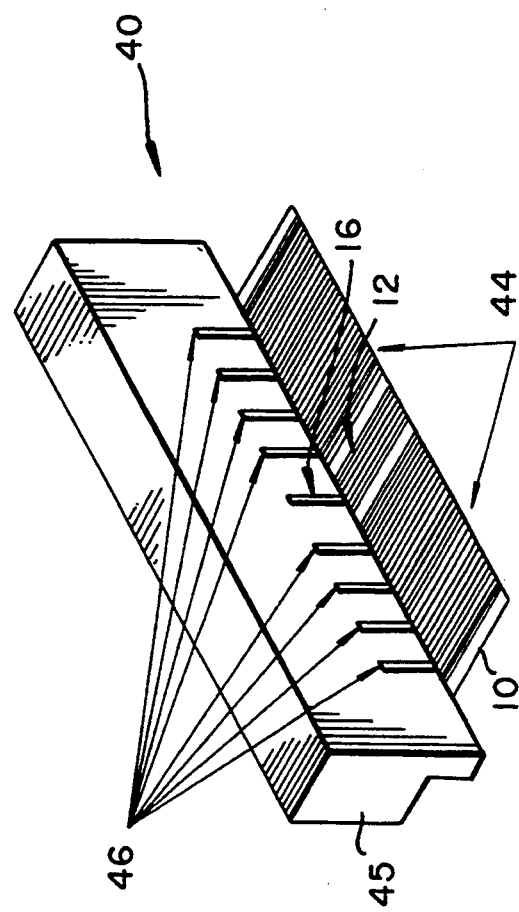
FIG. 5 is a perspective view of a head-to-tape interface for multi-channel linear recording apparatus with which the present invention may be used.

FIG. 5 is a perspective view of a head-to-tape interface for a multi-track linear recording apparatus, denoted generally 40, for which the present invention may be used. The magnetic tape 10 contains two groups of twenty data tracks 44. The forty data tracks 44 are accessed by five passes of the tape 10 across a head assembly 45 containing eight magnetic record/playback heads 46. The servo head 16, in accordance with the invention, is situated between two groups of four record/playback heads 46, and serves for playing back a preformatted servo signal of a predetermined spatial frequency recorded on six dedicated servo tracks 12 located at the center of the tape 10, between the two groups of twenty data tracks 44.

Figure 6:
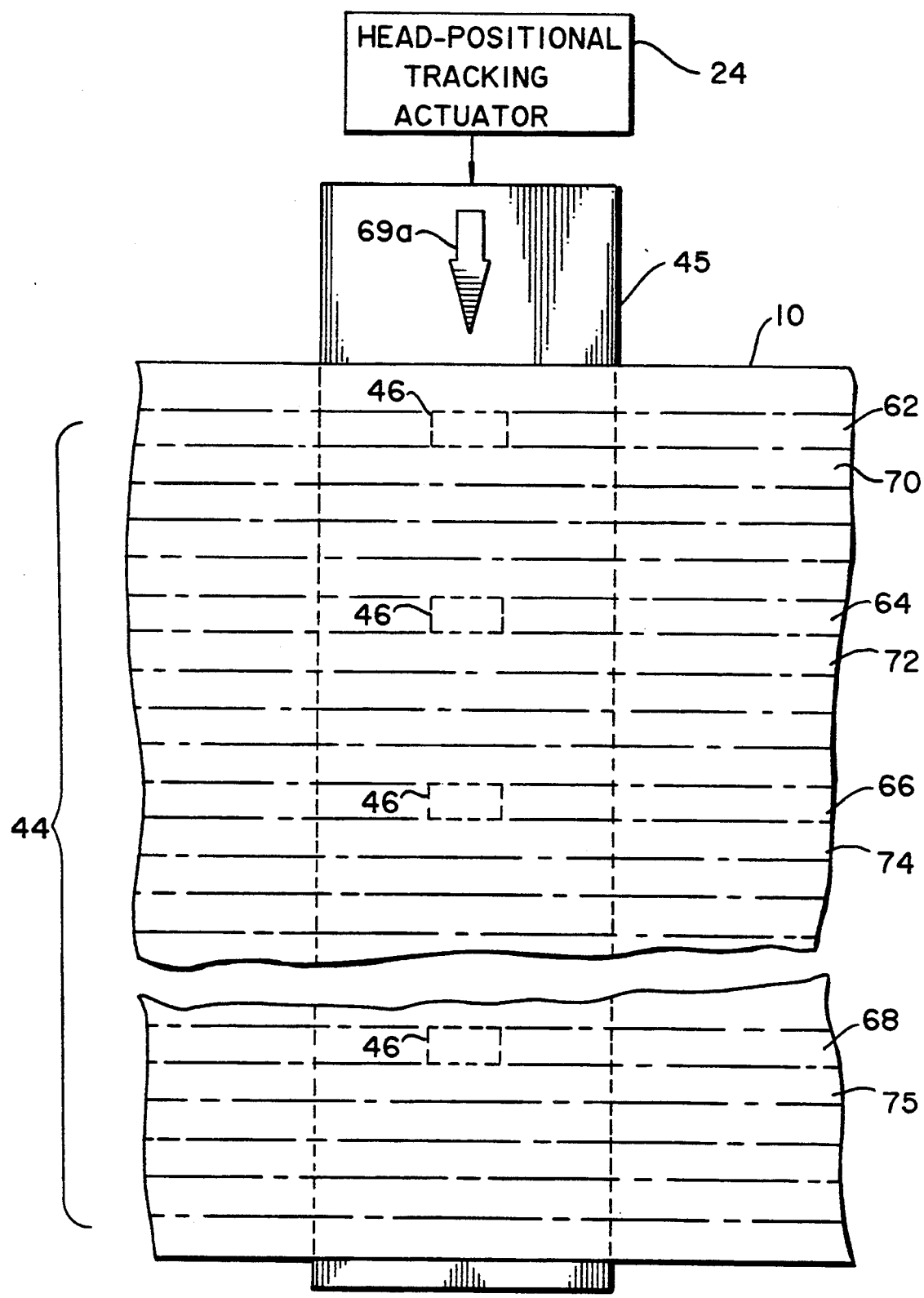
FIG. 6 is a broken planar view showing multiple magnetic heads aligned with respective data tracks of a multi-track magnetic tape.

Data are recorded and played back from the forty data tracks 44 by incrementally positioning the head assembly 45 in five discrete positions across the width of the tape 10. The broken planar view of FIG. 6 shows four of the eight data record/playback heads 46 positioned for recording, respectively, on tracks 62, 64, 66 and 68 during one pass of the tape 10. Under the control of the head-positioning tracking actuator 24, the head assembly 45 is incrementally stepped in the direction of the arrow 69a wherein the four heads 46 that are shown are positioned for recording on tracks denoted 70, 72, 74 and 76. For recording on those four tracks, the tape 10 is now transported in the reverse direction. To record over the entire useable area of the tape 10, data are recorded on the tape in a serpentine pattern during three tape passes in one direction and two passes in the opposite direction.

Figure 7:
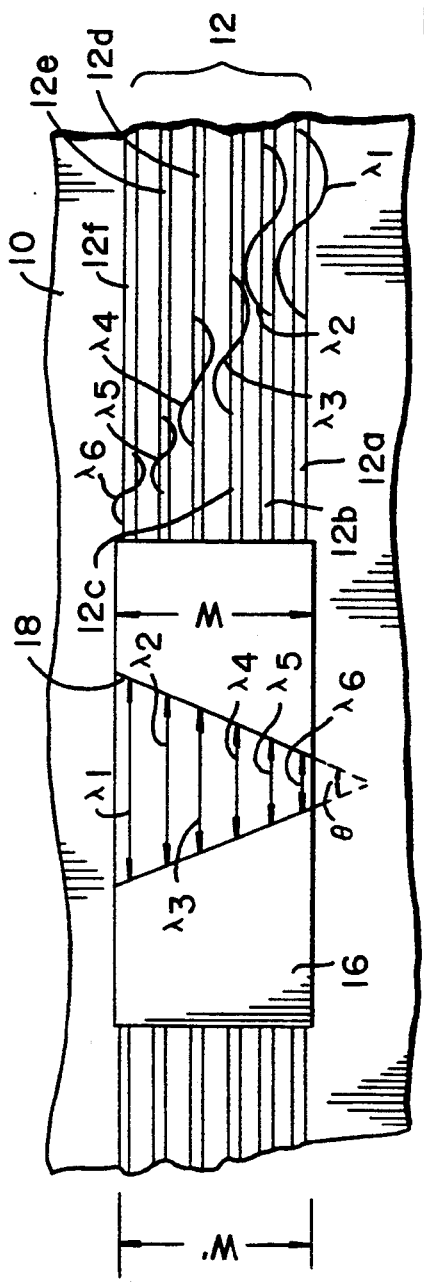
FIG. 7 is an overhead planar view of a servo head, in accordance with the invention, positioned with respect to multiple dedicated servo tracks of a magnetic tape.

With multiple servo tracks 12, preferably a servo signal recorded for a particular servo track (one for each servo track) has a wavelength that is different in length from the respective wavelengths of the servo signals recorded on the other tracks. FIG. 7 illustrates the wavelengths $\lambda_1, \lambda_2 ---, \lambda_6$ of the respective servo signals and the placement of the servo signals among the six dedicated servo tracks 12 in relation to the tapered transducing gap 18 of the servo head 16. As shown, the width, W, of the servo head 16 corresponds to the width, $W^1$, of the tape 10 on which the multiple servo tracks 12 are recorded. The multiple servo signals are arranged such that the wavelength $\lambda_1$ of the servo signal recorded on the lowermost servo track 12a is equal to the length $\lambda_1$ of the upper end of the transducing gap 18. The transducing gap 18 is tapered at an angle, $\Theta$, such that the wavelength $\lambda_6$ of the servo signal recorded on the uppermost servo track 12f is equal to the length $\lambda_6$ of the lower end of the gap. Intermediate segments of the transducing gap 18 equal, in reverse order, the wavelengths $\lambda_2$, $\lambda_3$, $\lambda_4$, and $\lambda_5$ recorded, respectively on intermediate servo tracks 12b --- 12e.

With this arrangement, the servo head 16 may be stepped across the six servo tracks 12a --- 12f in increments corresponding to the servo track pitch, i.e., the center-to-center spacing between adjacent servo tracks. In each of six servo head positions, there is only one segment of the transducing gap 18 whose magnetic gap length equals the wavelength of the servo signal on the servo track with which that gap segment is aligned. A particular advantage of this arrangement is that signals played back from respective segments of the transducing gap 18 on opposing sides of an "aligned" servo track 12, tend to cancel each other, thereby maintaining a null in its output when the servo head 16 is aligned properly with a particular one of the six servo tracks 12.

Noise played back can further be suppressed by means of employing servo signals having much larger spatial wavelengths than the respective wavelengths of recorded data signals. Thus, short-wavelength data signals played back will be multiple "gap nulls" out on the response curve (FIG. 1) of the servo head, and accordingly will be relatively small.

Figure 8:
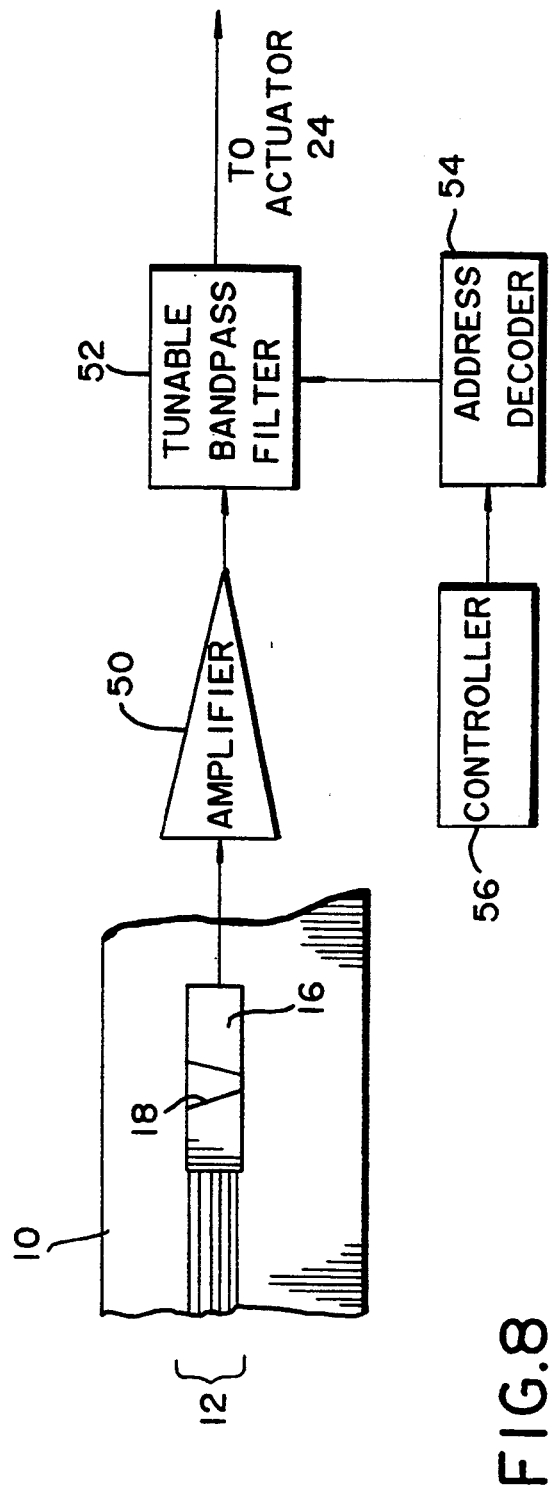
FIG. 8 is a partial schematic of tracking control apparatus for use with the servo head and multiple servo tracks of FIG. 7.

FIG. 8 shows tracking control apparatus for use with multiple servo signals having different spatial wavelengths. For that purpose, a broadband amplifier 50, coupled to the output of the servo head 16, serves for amplifying to an appropriate level servo playback signals having the temporal frequencies, $f_i = v/\lambda_i$. A tunable bandpass filter 52, connected to the output of the amplifier 50, functions to suppress noise by passing the temporal frequency of the servo signal played back from the servo track that the head 16 is to follow. To that end, a track address decoder 54 functions, in response to input from a controller 56, to tune the filter 52 to an appropriate center frequency.

The invention has been described in detail with reference to the figures; however, it will be appreciated that variations and modifications are possible within the spirit and scope of the invention. For example, although the invention requires a servo head having a tapered transducing gap, it will be clear to those skilled in the art that such a tapered gap rather than being symmetrically V-shaped, as shown in FIGS. 2 and 4, can be defined by opposing planar pole faces in which one pole face is orthogonal to a servo track whereas the other pole face is oriented oblique to the servo track.

What is claimed is:

1. Tracking control apparatus comprising the combination of (a) a magnetic recording medium including a dedicated servo track having recorded thereon a single servo signal having a fixed spatial wavelength, and (b) magnetic playback apparatus comprising a servo tracking head including an elongated tapered transducing gap, transverse to said dedicated servo track, having (1) at a first end of said elongated gap a magnetic gap length which is less than the spatial wavelength of the recorded servo signal, and (2) at a second opposing end of said tapered gap a magnetic gap length which is greater than the spatial wavelength of the recorded servo signal, said gap for positioning solely over said servo track and reading information from only said single fixed spatial wavelength servo signal, tracking actuator means being provided for moving said servo tracking head laterally with respect to said servo track in response to a polarity dependent tracking error signal produced by said servo tracking head, to position in alignment with said servo track the portion of said tapered transducing gap between opposing ends thereof whose magnetic gap length is equal to one cycle of the spatial wavelength of the recorded servo signal.

2. Tracking control apparatus as defined in claim 2 wherein the tracking error signal is functionally related to the difference between the spatial wavelength of the recorded servo signal and the magnetic gap length of the portion of said tapered transducing gap that is aligned with said servo track.

3. Tracking control apparatus as defined in claim 1 wherein said servo tracking head has a V-shaped transducing gap.

4. Tracking control apparatus as defined in claim 1 wherein said servo tracking head has (1) at said first end of said elongated gap a magnetic gap length that is approximately half the spatial wavelength of the recorded servo signal, and (2) at said second opposing end of said tapered gap a magnetic gap length that is approximately 50 percent larger than the spatial wavelength of the recorded servo signal.

5. Tracking control apparatus comprising the combination of (a) a magnetic recording medium including a plurality of N dedicated servo tracks each of which has recorded thereon a servo signal having a unique fixed spatial wavelength, and (b) magnetic playback apparatus comprising a servo tracking head including an elongated tapered transducing gap, transverse to each of said N dedicated servo tracks, having (1) at a first end of said elongated gap a magnetic gap length which is no greater than the smallest spatial wavelength of the N servo signals recorded, and (2) at a second opposing end of said tapered gap a magnetic gap length which is no smaller than the largest spatial wavelength of the N recorded servo signals, said gap for positioning solely over said N servo tracks, a tunable filter for transmitting a selected single wavelength signal from one of said N servo tracks read by said head, .tracking actuator means fed by said tunable filter., said actuator being provided to move laterally said servo tracking head with respect to said N servo tracks in response to a polarity dependent tracking error signal derived from said selected single wavelength signal produced by said servo tracking head.

6. Tracking control apparatus as defined in claim 5 wherein the respective servo signals are arranged on said N servo tracks monotonically with respect to their wavelengths in reverse order to the variation in magnetic gap length of said tapered transducing gap.

7. Tracking control apparatus as defined in claim 6 wherein said servo tracking head is movable laterally with respect to said N servo tracks to position a portion of said tapered transducing gap between opposing ends thereof whose magnetic gap length is equal to the spatial wavelength of a servo signal recorded on only one of said N servo tracks.

8. Tracking control apparatus comprising the combination of (a) a magnetic recording medium including a dedicated servo track having recorded thereon a servo signal having a fixed spatial wavelength, and (b) magnetic playback apparatus comprising a servo tracking head including an elongated tapered transducing gap, transverse to said dedicated servo track, having (1) at a first end of said elongated gap a magnetic gap length which is less than the spatial wavelength of the recorded servo signal, and (2) at a second opposing end of said tapered gap a magnetic gap length which is greater than the spatial wavelength of the recorded servo signal, tracking actuator means being provided for moving said servo tracking head laterally in response to a polarity dependent tracking error signal produced by said servo tracking head, to position in alignment with said servo track the portion of said tapered transducing gap between opposing ends thereof whose magnetic gap length is equal to the spatial wavelength of the recorded servo signal, the tracking error signal being functionally related to the difference between a single cycle of the spatial wavelength of the recorded servo signal and the magnetic gap length of the portion of said tapered transducing gap that is aligned with said servo track.

* * * * *